United States Patent
Ingurthi et al.

(10) Patent No.: US 11,942,607 B2
(45) Date of Patent: Mar. 26, 2024

(54) SYSTEMS AND METHODS TO IMPROVE BATTERY PACK SHELF-LIFE

(71) Applicant: SCHNEIDER ELECTRIC IT CORPORATION, Foxboro, MA (US)

(72) Inventors: Nagaraju Ingurthi, Bangalore (IN); Sivanageswararao Uddanti, Bangalore (IN); Chandrasekaran Jayaraman, Bangalore (IN); Pradeep Tolakanahalli Nagabhushanrao, Bangalore (IN)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 289 days.

(21) Appl. No.: 17/460,518

(22) Filed: Aug. 30, 2021

(65) Prior Publication Data

US 2022/0069365 A1 Mar. 3, 2022

(30) Foreign Application Priority Data

Aug. 30, 2020 (IN) .............................. 202011037350

(51) Int. Cl.
*H02J 7/00* (2006.01)
*H01M 10/42* (2006.01)
(Continued)

(52) U.S. Cl.
CPC ....... *H01M 10/425* (2013.01); *H01M 10/441* (2013.01); *H01M 10/482* (2013.01); (Continued)

(58) Field of Classification Search
CPC .......................... H02J 7/00306; H02J 7/0048
See application file for complete search history.

(56) References Cited

U.S. PATENT DOCUMENTS

| 6,249,106 | B1 | 6/2001 | Turner et al. |
| 7,579,842 | B2 | 8/2009 | Hunter et al. |

(Continued)

FOREIGN PATENT DOCUMENTS

| CN | 103956710 A | 7/2014 |
| CN | 105024411 A | 11/2015 |

(Continued)

OTHER PUBLICATIONS

Extended European Search Report from corresponding European Application No. 21193698.4 dated Jan. 17, 2022.

*Primary Examiner* — Robert Grant
(74) *Attorney, Agent, or Firm* — Lando & Anastasi, LLP

(57) ABSTRACT

Examples of the disclosure include a battery system comprising an output configured to provide output power to a load, one or more battery cells configured to store electrical energy to provide to the load, and a battery management system configured to receive one or more operational parameters of the battery system, determine whether the one or more operational parameters are less than at least one operational-parameter threshold, modify a discharge threshold of the one or more battery cells responsive to determining that the one or more operational parameters are less than the at least one operational-parameter threshold, and control the battery system to be in a battery-optimization mode responsive to determining that a discharge level of the one or more battery cells is below the discharge threshold.

21 Claims, 6 Drawing Sheets

(51) Int. Cl.
*H01M 10/44* (2006.01)
*H01M 10/48* (2006.01)

(52) U.S. Cl.
CPC ........ *H02J 7/00306* (2020.01); *H02J 7/0048* (2020.01); *H01M 2010/4271* (2013.01)

(56) References Cited

U.S. PATENT DOCUMENTS

2014/0068310 A1    3/2014  Sultenfuss et al.
2016/0190833 A1*   6/2016  Roumi ...................... H02J 7/00
                                                        320/136
2019/0379219 A1*  12/2019  Snyder ................ H02J 7/00304

FOREIGN PATENT DOCUMENTS

| CN | 105098276 | A | 11/2015 |
| CN | 111114328 | A | 5/2020 |
| CN | 111129626 | A | 5/2020 |
| CN | 111251940 | A | 6/2020 |
| CN | 112531828 | A | 3/2021 |
| EP | 3487031 | A1 | 5/2019 |

* cited by examiner

SYSTEMS AND METHODS TO IMPROVE BATTERY PACK SHELF-LIFE

CROSS-REFERENCE TO RELATED APPLICATIONS

This application claims priority under 35 U.S.C. § 119(a) to Indian Patent Application Serial No. 202011037350, titled "A NOVEL METHOD TO ENHANCE LI-ION BATTERY PACK SHELF LIFE," filed on Aug. 30, 2020, which is hereby incorporated by reference in its entirety.

BACKGROUND

1. Field of the Disclosure

At least one example in accordance with the present disclosure relates generally to improving energy-storage-device technology.

2. Discussion of Related Art

Energy-storage devices may include battery packs, such as lithium-ion (or "Li-Ion") battery packs and lead-acid battery packs. A Li-Ion battery pack may include an array of Li-Ion cells, or a "cell assembly," and a battery management system (BMS) to monitor, control, and protect the cell assembly to meet functional and safety requirements. The BMS may need to be functional (partly or fully) during the entire life of the battery pack including shipment, storage, and shelf conditions, and consumes power from the battery pack.

SUMMARY

According to at least one aspect of the present disclosure, a battery system is provided comprising an output configured to provide output power to a load, one or more battery cells configured to store electrical energy to provide to the load, and a battery management system configured to receive one or more operational parameters of the battery system, determine whether the one or more operational parameters are less than at least one operational-parameter threshold, modify a discharge threshold of the one or more battery cells responsive to determining that the one or more operational parameters are less than the at least one operational-parameter threshold, and control the battery system to be in a battery-optimization mode responsive to determining that a discharge level of the one or more battery cells is below the discharge threshold.

In at least one example, the one or more operational parameters include a state of charge of the one or more battery cells, and the at least one operational-parameter threshold includes a threshold state of charge. In some examples, modifying the discharge threshold of the one or more battery cells responsive to determining that the one or more operational parameters are less than the at least one operational-parameter threshold includes increasing the discharge threshold responsive to determining that the state of charge of the one or more battery cells is below the threshold state of charge. In various examples, the threshold state of charge is approximately 50% of a full initial charge.

In at least one example, the one or more operational parameters include an amount of power drawn by the load, and the at least one operational-parameter threshold includes a threshold load of the battery system. In some examples, modifying the discharge threshold of the one or more battery cells responsive to determining that the one or more operational parameters are less than the at least one operational-parameter threshold includes increasing the discharge threshold responsive to determining that the amount of power drawn by the load is below the threshold load of the battery system. In various examples, the threshold load is approximately 25% of the rated load.

In at least one example, the discharge threshold is a value of a cell voltage of the one or more battery cells. In some examples, the battery management system is configured to control the battery system to be in a first battery-optimization mode responsive to determining that the discharge level of the one or more battery cells is below a first discharge threshold, and control the battery system to be in a second battery-optimization mode responsive to determining that the discharge level of the one or more battery cells is below a second discharge threshold, the second discharge threshold being less than the first discharge threshold.

In various examples, the second battery-optimization mode includes disabling substantially all functionality of the battery management system. In at least one example, the battery management system is configured to control the battery system to be in an active mode responsive to determining that the discharge level of the one or more battery cells is above the first discharge threshold, and wherein the first battery-optimization mode includes disabling functionality of the battery management system to reduce power consumption relative to the active mode.

According to at least one aspect of the disclosure, a non-transitory computer-readable medium storing thereon sequences of computer-executable instructions for controlling a battery system having one or more battery cells configured to store electrical energy to provide to a load is provided, the sequences of computer-executable instructions including instructions that instruct at least one processor to receive one or more operational parameters of the battery system, determine whether the one or more operational parameters are less than at least one operational-parameter threshold, modify a discharge threshold of the one or more battery cells responsive to determining that the one or more operational parameters are less than the at least one operational-parameter threshold, and control the battery system to be in a battery-optimization mode responsive to determining that a discharge level of the one or more battery cells is below the discharge threshold.

In some examples, the one or more operational parameters include a state of charge of the one or more battery cells, and the at least one operational-parameter threshold includes a threshold state of charge. In at least one example, instructing the at least one processor to modify the discharge threshold of the one or more battery cells responsive to determining that the one or more operational parameters are less than the at least one operational-parameter threshold includes increasing the discharge threshold responsive to determining that the state of charge of the one or more battery cells is below the threshold state of charge. In various examples, the one or more operational parameters include an amount of power drawn by the load, and the at least one operational-parameter threshold includes a threshold load of the battery system.

In some examples, instructing the at least one processor to modify the discharge threshold of the one or more battery cells responsive to determining that the one or more operational parameters are less than the at least one operational-parameter threshold includes increasing the discharge threshold responsive to determining that the amount of power drawn by the load is below the threshold load of the battery system. In at least one example, the discharge threshold is a value of a cell voltage of the one or more battery cells. In various examples, the instructions further instruct the at least one processor to control the battery system to be in a first battery-optimization mode responsive to determining that the discharge level of the one or more battery cells is below a first discharge threshold, and control the battery system to be in a second battery-optimization mode responsive to determining that the discharge level of the one or more battery cells is below a second discharge threshold, the second discharge threshold being less than the first discharge threshold.

In some examples, the battery system includes a battery management system, and the instructions further instruct the at least one processor to be in an active mode responsive to determining that the discharge level of the one or more battery cells is above the first discharge threshold, and the first battery-optimization mode includes disabling functionality of the battery management system to reduce power consumption relative to the active mode. In at least one example, the battery system includes a battery management system, and the second battery-optimization mode includes disabling substantially all functionality of the battery management system.

According to at least one aspect of the disclosure, a method of assembling a battery system is provided, the method comprising providing the battery system, the battery system having an output configured to provide output power to a load, one or more battery cells configured to store electrical energy to provide to the load, and a battery management system, coupling the one or more battery cells to the output, and coupling the battery management system to the one or more battery cells, the battery management system being configured to receive one or more operational parameters of the battery system, determine whether the one or more operational parameters are less than at least one operational-parameter threshold, modify a discharge threshold of the one or more battery cells responsive to determining that the one or more operational parameters are less than the at least one operational-parameter threshold, and control the battery system to be in a battery-optimization mode responsive to determining that a discharge level of the one or more battery cells is below the discharge threshold.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
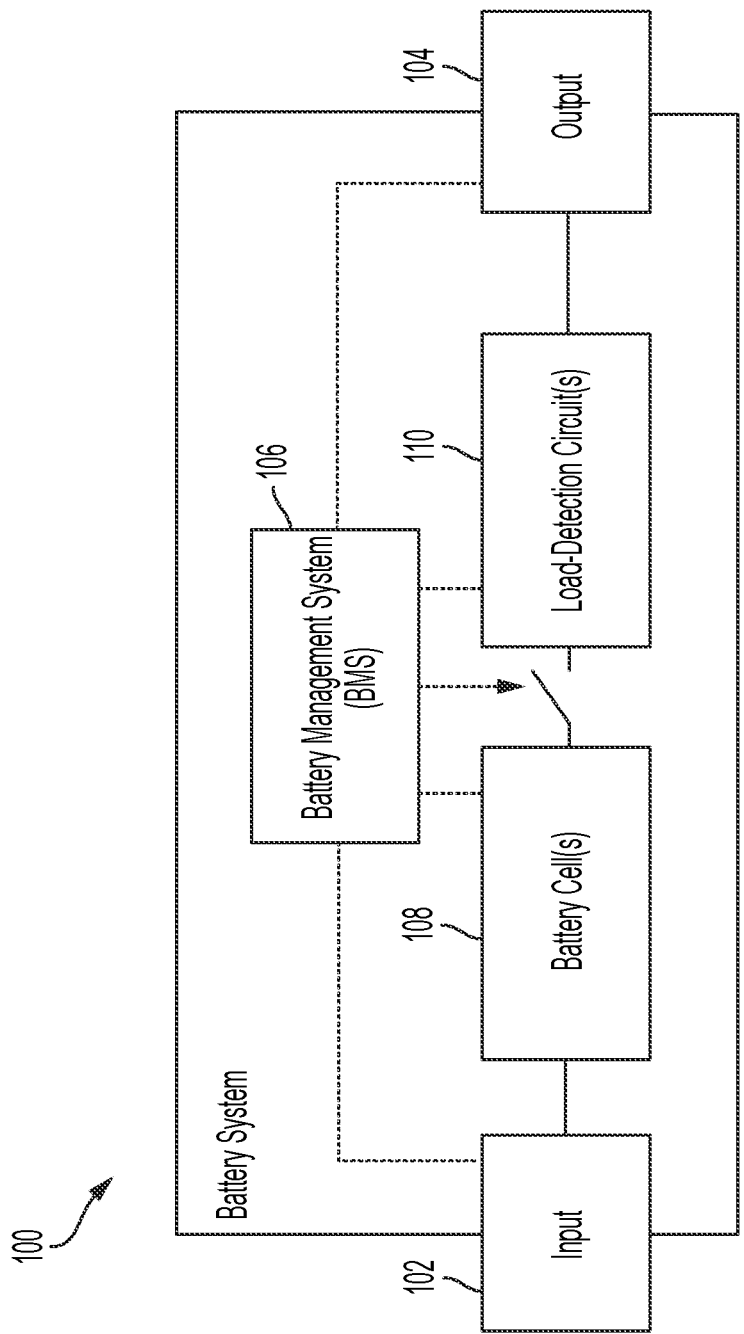
FIG. 1 illustrates a block diagram of a battery system according to an example.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

A Li-Ion battery pack may include one or more battery cells and a battery management system (BMS). The battery pack may be coupled to, and provide power to, a load. The battery pack discharges power to the load. For example, a battery pack may be coupled to an uninterruptible power supply (UPS) to provide continuous, uninterrupted power to a load connected to the UPS. The battery pack may also be coupled to a power source. The power source provides power to the battery pack to recharge the battery pack. For example, the battery pack may be coupled to a utility-grid power supply either directly or via the UPS.

Although the Li-Ion battery pack may be configured to be coupled to provide power to a load, the battery pack is typically not coupled to a load immediately after manufacture. For example, the Li-Ion battery pack may be placed in storage and/or may be shipped to a user before being coupled to a load. This duration of time may be referred to as a storage life. As used herein, a "storage life" includes the time between manufacturing and installation of a battery in an application. This duration includes the transportation, storage at a warehouse, and so forth. In some examples, the storage life may include such transportation and storage at a warehouse after installation as well, such as if the battery pack is removed from a first application, stored, and/or transported to a second application. The state of charge during shipment and/or storage may be stipulated by regulatory authorities. During this period, the state of charge of the battery pack may be maintained within a stipulated range at a warehouse such that a life of the battery pack is not significantly affected.

Once a battery pack is in use, it may be considered to have begun its active life. As used herein, an "active life" includes a time duration for which a battery pack is installed and used in an intended application. During this period, the battery pack may be subjected to continuous charge and discharge cycles. Often the application requires the batteries to cycle between full charge to complete discharge. During the active life, the battery pack may be in one of several modes of operation, including an active mode.

As used herein, in an "active mode" a BMS is fully functional and the power consumed by the BMS is maximized. The BMS operates in this mode during the normal usage of the battery pack. This may have multiple sub-modes of operation. Two sub-modes include a charge mode and a discharge mode. As the power consumed by the BMS is high in the active mode, the active mode may not be used during shipment, storage, and/or shelf conditions.

As used herein, in a "charge mode" the battery pack receives energy from a power source, such as a source of utility power, to recharge the battery cells. The BMS operates in the charge mode if the utility power is within the acceptable range (for example, an acceptable range of voltage values). The battery pack can be considered to reach its full stored capacity if the battery voltage reaches a first pre-determined threshold level (TL-0), which may be a voltage level. After reaching this voltage level the BMS may sustain the battery voltage level around this value.

As used herein, in a "discharge mode" the battery pack provides power to a load. The BMS may operate in the discharge mode if, during the active mode, the utility power is outside the acceptable range. During the discharge mode, the voltage level of the battery cells may decrease as the battery cells discharge energy to the load. If the battery voltage level reaches (or falls below) a second predetermined threshold level (TL-1), which may be a voltage level, then the BMS would move to "shelf mode 1," or a "first shelf mode."

In this mode, the battery pack may cease discharging power to a load. Accordingly, if the voltage level of the battery pack reaches the predetermined level TL-1, then the battery is said to have reached "end of discharge." As used herein, a "runtime (Tr)" includes the time taken by the battery pack to transition from a fully charged condition (voltage threshold level TL-0) to the end of discharge (voltage threshold level TL-1) as the battery pack discharges. In various examples, an estimated runtime may be specified or predicted based on a specified load and other predetermined conditions, such as temperature, humidity, and so forth. Similarly, as used herein, a "recharge time (Tchg)" includes the time taken by the battery pack to charge from the end of discharge condition to a fully charged condition. In various examples, an estimated recharge time may be specified or predicted based on specified input AC parameters (for example, power, current, and so forth) and other predetermined conditions, such as temperature, humidity, and so forth.

The BMS may remain substantially functional and the battery pack may return to active mode as soon as a source of power, such as the utility power, is available to the battery pack. However, some functionality of the BMS may be disabled during the first shelf mode as compared to the discharge mode, such that power consumption is reduced. The power consumed by the BMS in this mode is significantly lower than the discharge mode, but may be higher than a second shelf mode, described below. The shelf life duration in the first shelf mode may be designated as T1.

A voltage of the battery cells may continue to decrease even if power is not being discharged to a load. For example, a voltage of the battery cells may decrease due to a leakage current discharged by the battery cells and/or due to maintaining some functionality of the BMS. If the battery voltage reaches (or falls below) a third predetermined threshold level (TL-2) then the BMS may move to "shelf mode 2," or a "second shelf mode." In this mode, all functionalities of the BMS may be disabled such that the BMS is considered to be in an off mode. The battery pack may return to active mode with significant delay after an AC source is applied to it. The power consumed by the BMS in this mode is minimal and hence most suited for shipping, storage, and/or shelf conditions. The shelf life duration in this mode may be designated as T2.

Accordingly, the first and second shelf modes may increase a life of the battery pack by disabling functionality of the battery pack when the battery pack is discharged to corresponding discharge levels, which may be voltage levels. This may advantageously increase a lifetime of the battery pack by avoiding over-discharge, which may adversely affect a health of the battery pack. As used herein, the "shelf life (Ts)" refers to a total time spent by the battery pack in the shelf moves (that is, a cumulative time in the first and second shelf moves). Hence, Ts=T1+T2.

The battery pack may eventually reach an end-of-life state in which the battery pack is irrecoverable and should be replaced. As used herein, in an "irrecoverable mode" the battery pack is rendered irrecoverably unusable. The battery pack may enter the irrecoverable mode if, in the second shelf mode, the battery voltage level reaches (or falls below) a fourth predetermined threshold level (TL-3), which may be a voltage level.

In an intended application, often there are conditions or times during which a battery pack is not connected to a power source to recharge the battery pack. For example, the battery pack may be disconnected from the power source (such as a utility grid) or a charger may not be active for a period of time. Examples of conditions may include the equipment being unplugged from mains for an extended period, long power outages followed by a complete discharge of the battery, and an AC voltage being out of acceptable range for an extended period. If the battery pack does not receive any replenishment charge during this period, the battery pack may be adversely affected. As discussed above, the time spent in such states may refer to the shelf life of the battery pack. In various examples, the shelf life may be less than the storage life. Accordingly, it may be beneficial to increase a battery shelf life such that a burden on a customer to maintain a state of charge of the battery is reduced.

In various examples, a voltage level of a battery pack may be determined. The battery pack may be controlled to be in a certain mode of operation depending on whether the voltage level is within certain discharge thresholds or ranges. Each mode of operation may correspond to a respective discharge threshold or range. As the battery pack is discharged, the voltage level may decrease and a mode of operation of the battery pack may be altered as the voltage level falls within different discharge thresholds or ranges.

Examples of the disclosure include modifying discharge thresholds demarcating different modes of operation such that a battery shelf life is maximized. Lower voltage thresholds may correspond to modes of operation exhibiting lower power consumption. Modifying the discharge thresholds may include increasing the discharge thresholds. Accordingly, the battery pack may be controlled to enter the modes of operation exhibiting lower power consumption more quickly, because the discharge thresholds are increased.

The discharge thresholds may be modified based on one or more operational parameters. The operational parameters may indicate whether the battery pack is being used in a normal application. The discharge thresholds may be increased if the battery pack is not being used in a normal application, such as in abnormal applications that degrade a health of the battery pack more quickly. It may be advantageous to minimize an amount of time that the battery pack is used in these applications to maximize the lifetime of the battery pack, which can be achieved by increasing the discharge thresholds.

In one example, the one or more operational parameters indicate a current state of charge (SOC) of the battery pack. The discharge thresholds may be increased responsive to determining that the SOC of the battery pack is below a threshold SOC. For example, the discharge thresholds may be increased responsive to determining that a current SOC of the battery pack is less than 50% of an initial full SOC of the battery pack.

In another example, the one or more operational parameters indicate a present load of the battery pack. The discharge thresholds may be increased responsive to determining that the load on the battery pack is below a threshold load. For example, the discharge thresholds may be increased responsive to determining that a current load on the battery pack is less than 25% of a rated load of the battery pack.

Accordingly, a lifetime of the battery pack may be increased by increasing discharge thresholds demarcating different modes of operation. The discharge thresholds may be increased where the battery pack is not being used in a normal application. Current battery systems, such as battery packs in UPS s, may implement static discharge thresholds for determining a mode of operation of the battery pack. Such battery systems may operate inefficiently, because the battery pack may be operated in non-normal applications, which may rapidly degrade a health of the battery pack, for a significant amount of time. This is a technical problem.

An exemplary embodiment of a battery system is provided comprising an output configured to provide output power to a load, one or more battery cells configured to store electrical energy to provide to the load, and a battery management system configured to receive one or more operational parameters of the battery system, determine whether the one or more operational parameters are less than at least one operational-parameter threshold, modify a discharge threshold of the one or more battery cells responsive to determining that the one or more operational parameters are less than the at least one operational-parameter threshold, and control the battery system to be in a battery-optimization mode responsive to determining that a discharge level of the one or more battery cells is below the discharge threshold.

At least this foregoing combination of features comprises a battery system that serves as a technical solution to the foregoing technical problem. This technical solution is not routine and is unconventional. This technical solution is a practical application of the battery-system design that solves the foregoing technical problem and constitutes an improvement in the technical field of battery-pack systems at least by increasing a lifetime of the battery pack to maximize an amount of use that users may receive from battery packs.

FIG. 1 illustrates a block diagram of a battery system 100 according to an example. The battery system 100 may be configured to provide stored power to a load. For example, the battery system 100 may be implemented in, or in connection with, a UPS configured to provide continuous, uninterrupted power to a load. In other examples, the battery system 100 may provide power to one or more loads other than in connection with a UPS. The battery system 100 includes an input 102, an output 104, a battery management system (BMS) 106, one or more battery cells 108 ("battery cell 108"), and a load-detection circuit 110.

It is to be appreciated that aspects of the battery system 100 are illustrated for purposes of explanation, and that certain aspects may be combined, replaced, or added. For example, in some implementations the load-detection circuit 110 may be a component of the BMS 106. In another example, the input 102 and the output 104 may be a single physical connection, and are illustrated separately for purposes of explanation only.

The input 102 is coupled to the battery cell 108, and is configured to be coupled to a source of input power, such as a utility mains. In some examples, the input 102 may be communicatively coupled to the BMS 106. The output 104 is coupled to the load-detection circuit 110, and is configured to be coupled to a load. In some examples, the output 104 may be communicatively coupled to the BMS 106. The BMS 106 is communicatively coupled to the input 102, the output 104, the battery cell 108, and the load-detection circuit 110. The battery cell 108 is coupled to the input 102 and the load-detection circuit 110, and is communicatively coupled to the BMS 106. The load-detection circuit 110 is coupled to the battery cell 108 and the output 104, and is communicatively coupled to the BMS 106.

The battery cell 108 is configured to store electrical energy and discharge stored electrical energy to the output 104. For example, where the battery system 100 is implemented in connection with a UPS, the battery cell 108 may be configured to discharge stored power to the output 104 when acceptable power (for example, utility mains power) is otherwise unavailable to a load coupled to the output 104. The battery cell 108 may therefore provide uninterrupted power to a load when the load is otherwise unable to receive adequate power from a main power source, such as during a blackout.

Energy stored in the battery cell 108 decreases as power is discharged. The input 102 is configured to receive input power from a power source and provide the input power to the battery cell 108. The input power recharges the battery cell 108 and replenishes discharged power. In some examples, the battery system 100 may include a charger implemented between the input 102 and the battery cell 108 to recharge the battery cell 108.

The load-detection circuit 110 is configured to determine a load on the battery cell 108. For example, the load may include an amount of power supplied by the battery cell 108 to a device (also called a load) coupled to the output 104. The load-detection circuit 110 may include one or more current- and/or voltage-sensing components, such as one or more current transformers (CTs). In various examples, the load-detection circuit 110 may be implemented in series with the battery cell 108 such that power discharged by the battery cell 108 is measured by the load-detection circuit 110. In other examples, other implementations of a load-detection component may be utilized to determine a load of the battery cell 108.

The BMS 106 controls operation of the battery system 100. For example, the BMS 106 may control a discharge of the battery cell 108. In some examples, the battery cell 108 is switchably coupled to the output 104 and the load-detection circuit 110, and the BMS 106 switchably couples or decouples the battery cell 108 from the output 104 and the load-detection circuit 110. For example, the BMS 106 may couple the battery cell 108 to the load-detection circuit 110 and the output 104 when the battery cell 108 is to discharge stored power to a load coupled to the output 104, and otherwise decouple the battery cell 108 from the output 104 and the load-detection circuit 110. The BMS 106 may send and/or receive information and/or data to and/or from the input 102, output 104, battery cell 108, and load-detection circuit 110.

The battery system 100 may operate in one of several modes of operation, including a charge mode of operation and a discharge mode of operation. In the charge mode of operation, power is received at the input 102 from a power source (not illustrated) and provided to the battery cell 108 to charge the battery cell 108. In the discharge mode of operation, the battery cell 108 discharges stored power to the output 104. The BMS 106 controls the components of the battery system 100 in the charge mode and discharge mode of operation to perform these functions. The BMS 106 may control the battery system 100 to be in the discharge mode of operation responsive to determining that a load coupled to the output 104 otherwise lacks adequate power, such as because a utility mains power source is unavailable or insufficient.

It may be advantageous to stop discharging power from the battery cell 108 before the battery cell 108 is fully depleted, at least because fully depleting the battery cell 108 may adversely affect a health of the battery cell 108. In various examples, the battery cell 108 may be controlled to stop discharging power when the battery cell 108 reaches a certain discharge threshold. For example, a voltage level of the battery cell 108 may decrease as the battery cell 108 is discharged, and the discharge threshold may be a voltage threshold. If the voltage level of the battery cell 108 drops below the discharge threshold, the BMS 106 may control the battery cell 108 to stop discharging power to the output 104. As discussed below, there may be several voltage thresholds each corresponding to a respective mode of operation of the battery system 100.

Figure 2:
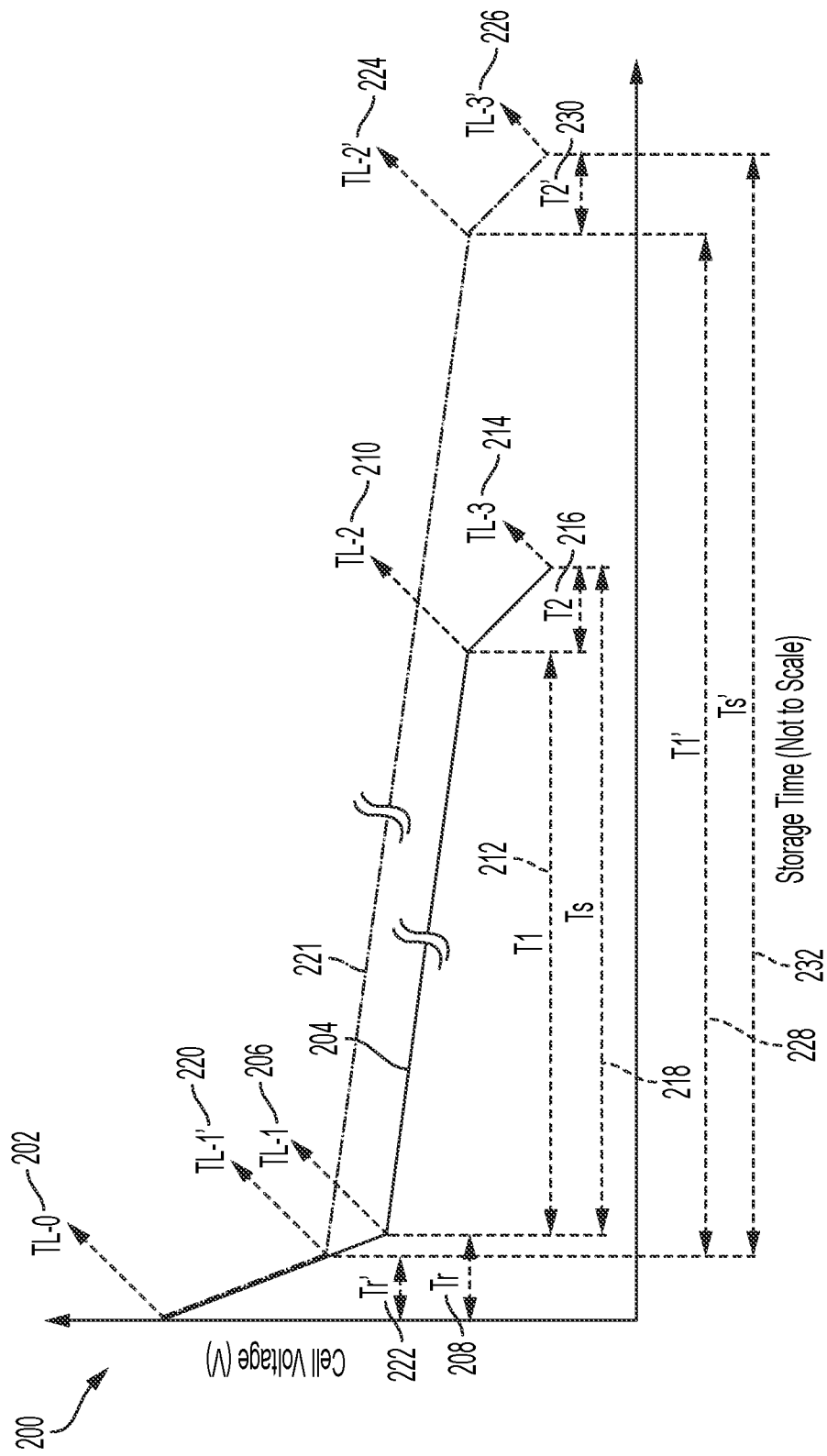
FIG. 2 illustrates a graph of a cell voltage of a battery cell over time according to an example.

FIG. 2 illustrates a graph 200 of a cell voltage of the battery cell 108 over time according to an example. A y-axis of the graph 200 indicates a cell voltage of the battery cell 108. An x-axis of the graph 200 indicates time. Aspects of the graph 200 are discussed in connection with FIG. 3.

Figure 3:
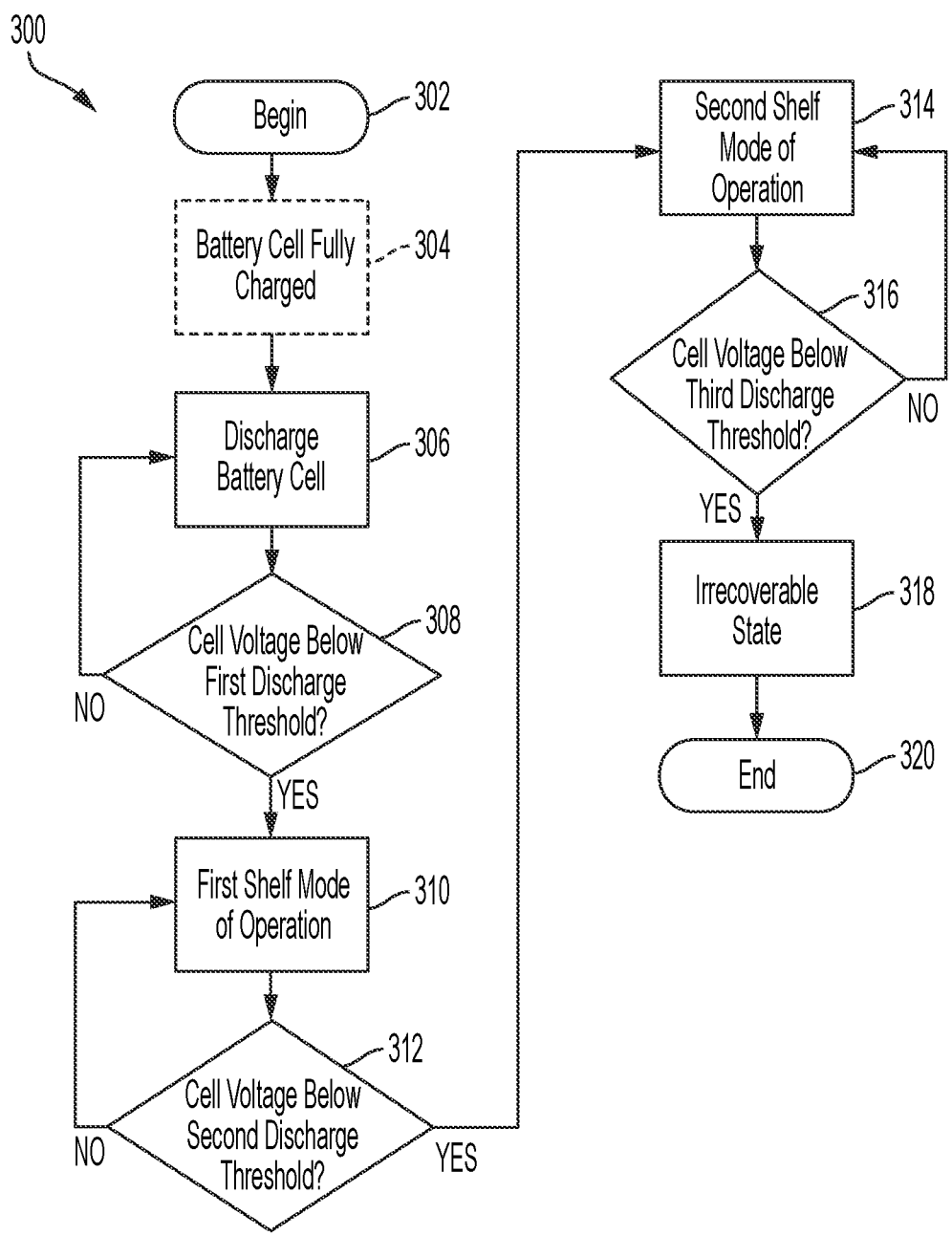
FIG. 3 illustrates a process of controlling the battery system of FIG. 1 in a discharge mode of operation according to an example.

FIG. 3 illustrates a process 300 of controlling the battery system 100 in the discharge mode of operation according to an example. The process 300 may be executed at least in part by the BMS 106 when the BMS 106 determines that the battery system 100 should be in the discharge mode of operation. As discussed above, the BMS 106 may control the battery system 100 to be in the discharge mode of operation responsive to determining that a load coupled to the output 104 otherwise lacks adequate power. Aspects of the process 300 are discussed in connection with FIG. 2.

At act 302, the process 300 begins.

At act 304, the battery cell 108 is fully charged. At a full charge, a voltage of the battery cell 108 may be at a maximum level. A fully charged voltage level 202 in FIG. 2 indicates a voltage level of the battery cell 108 at a full charge according to an example. It is to be appreciated that act 304 is illustrated for purposes of explanation of the fully charged voltage level 202. In some examples, act 304 may be optionally omitted. For example, the battery system 100 may be in the discharge mode of operation without beginning at the fully charged voltage level 202. In examples in which act 304 is omitted, the process 300 may proceed to act 306 from act 302.

At act 306, the battery cell 108 begins discharging stored power. For example, the BMS 106 may control the battery cell 108 to discharge stored power to a load coupled to the output 104. As the battery cell 108 discharges stored power, a voltage level of the battery cell 108 decreases from the fully charged voltage level 202, as illustrated by a first voltage-level trace 204 in the graph 200.

At act 308, a determination is made as to whether a voltage level of the battery cell 108 is below a first discharge threshold 206. The first discharge threshold 206 may indicate a discharge threshold below which the battery system 100 will enter a lower-power-consumption mode of operation, which may be referred to as a first shelf mode or a battery-optimization mode. As illustrated in the graph 200, the first discharge threshold 206 is less than the fully charged voltage level 202. A time that elapses between beginning to discharge the battery cell 108 at the fully charged voltage level 202 and reaching the first discharge threshold 206 may be referred to as a total runtime (Tr) 208.

If the voltage level of the battery cell 108 is not below the first discharge threshold 206 (308 NO), the process 300 returns to act 306. Acts 306 and 308 are repeatedly executed and the voltage level of the battery cell 108 continues to decrease, as illustrated by the first voltage-level trace 204. If a determination is made at act 308 that the voltage level of the battery cell 108 is below the first discharge threshold 206 (308 YES), then the process 300 continues to act 310.

At act 310, the BMS 106 controls the battery system 100 to be in the first shelf mode of operation. In the first shelf mode of operation, the BMS 106 controls the battery cell 108 to discontinue discharging power to the output 104. Additionally, functionality of the BMS 106 may be disabled. For example, communication functionality of the BMS 106 may be disabled, such as wireless-communication functionality. In another example, housekeeping functionality of the BMS 106 may be disabled in addition to, or in lieu of, communication functionality.

Disabling functionality of the BMS 106 advantageously reduces a power consumption of the battery system 100. Accordingly, the first shelf mode of operational may be referred to herein as an example of a battery-optimization mode of operation. However, if a main power source becomes available to the battery system 100 at the input 102, as discussed below, the BMS 106 may be able to re-enable the disabled functionality quickly. Performance of the battery system 100 is therefore not significantly adversely impacted by the first shelf mode, which may improve a user experience by eliminating perceived slowness of a response of the battery system 100 when or if power is again available at the input 102. A battery voltage of the battery system 100 may continue to decrease in the first shelf mode. The BMS 106 may control the battery system 100 to remain in the first shelf mode until a main power source is available, as discussed below, or until the battery voltage drops below a second discharge threshold.

At act 312, the BMS 106 determines whether the voltage level of the battery cell 108 is below a second discharge threshold 210. The second discharge threshold 210 may indicate a discharge threshold below which the battery system 100 will enter a mode of operation having a power consumption that is even lower than the first shelf mode, and may be referred to as a second shelf mode. As illustrated in the graph 200, the second discharge threshold 210 is less than the first discharge threshold 206. A time duration between entering the first shelf mode at the first discharge threshold 206 and entering the second shelf mode at the second discharge threshold 210 is referred to as a first shelf-mode duration 212.

If the voltage level of the battery cell 108 is not below the second discharge threshold 210 (312 NO), the process 300 returns to act 310. Acts 310 and 312 are repeatedly executed and the voltage level of the battery cell 108 continues to decrease, as illustrated by the first voltage-level trace 204. If a determination is made that the voltage level is below the second discharge threshold 210 (312 YES), the process 300 continues to act 314.

At act 314, the BMS 106 controls the battery system 100 to be in a second shelf mode of operation. In the second shelf mode of operation, substantially all of the functionality of the BMS 106 may be disabled. The functionality of the BMS 106 that is disabled in the first shelf mode of operation may be disabled as well as additional functionality. For example, such additional functionality may include certain user-interface elements, such as a user-interface element used to power on the battery system 100. Additional functionality may also include functionality to perform a cold boot of the battery system 100, that is, starting up the battery system 100 from a fully powered-off state. Disabling additional functionality of the BMS 106 may further reduce a power consumption of the battery system 100 relative to the first shelf mode. Accordingly, the second shelf mode may also be referred to as a battery-optimization mode, such that "battery-optimization mode" may refer to either the first or second shelf mode. If a main power source becomes available to the battery system 100 at the input 102, as discussed below, the BMS 106 may be able to re-enable the disabled functionality after a re-initiation period. A battery voltage of the battery system 100 may continue to decrease in the second shelf mode. The BMS 106 may control the battery system 100 to remain in the second shelf mode until a main power source is available, as discussed below, or until the battery voltage drops below a third discharge threshold.

At act 316, the BMS 106 determines whether the voltage level of the battery cell 108 is below a third discharge threshold 214. The third discharge threshold 214 may indicate a discharge threshold below which the battery system 100 is considered irrecoverable, and to have reached an end-of-life of the battery system 100. As illustrated in the graph 200, the third discharge threshold 214 is less than the second discharge threshold 210. If the voltage level of the battery cell 108 is not below the third discharge threshold 214 (316 NO), then the process 300 returns to act 314. Acts 314 and 316 are repeatedly executed, and a voltage level of the battery cell 108 continues to decrease. If the voltage level of the battery cell 108 is below the third discharge threshold 214 (316 YES), then the process 300 continues to act 318 and the battery system enters an irrecoverable state. A time between entering the second shelf mode at the second discharge threshold 210 and entering the irrecoverable state at the third discharge threshold 214 is referred to as a second shelf-mode duration 216. A total time spent in the first shelf mode and the second shelf mode is a sum of the first shelf-mode duration 212 and the second shelf-mode duration 216, and is referred to as a total shelf-mode duration 218.

At act 318, the battery system 100 is in an irrecoverable state. In the irrecoverable state, the battery system 100 may be considered inoperable and may no longer discharge power to a load. The battery system 100 may retain some functionality in the irrecoverable state, such as to output a notification to a user that the battery system 100 should be replaced. In other examples, the battery system 100 may disable all functionality indefinitely. The process 300 then ends at act 320.

Although not illustrated in the process 300 for purposes of clarity, the BMS 106 may repeatedly (for example, periodically, aperiodically, or continuously) determine whether a load coupled to the output 104 regains access to an adequate main power source, such as utility power, throughout execution of the process 300. The process 300 may terminate if the load regains access to the main power source, and the battery system 100 may transition from a discharge mode of operation to a charge mode of operation. The BMS 106 may control the battery system 100 to discontinue discharging power, and to recharge the battery cell 108 with power provided at the input 102 from the main power source that also powers the load coupled to the output 104.

For example, if the BMS 106 is repeatedly executing acts 306 and 308 and thereby discharging the battery cell 108, the BMS 106 may simultaneously be repeatedly determining whether access to mains power has been restored. If mains power is again available, the process 300 may be terminated. Similarly, if the BMS 106 is repeatedly executing acts 310 and 312 and thereby controlling the battery system 100 to be in the first shelf mode, the BMS 106 may simultaneously be repeatedly determining whether access to mains power has been restored. If mains power is again available, the process 300 may be terminated. Similarly, if the BMS 106 is repeatedly executing acts 314 and 316 and thereby controlling the battery system 100 to be in the second shelf mode, the BMS 106 may simultaneously be repeatedly determining whether access to mains power has been restored. If mains power is again available, the process 300 may be terminated.

Accordingly, while in the discharge mode of operation, the battery system 100 may enter various sub-modes of operation based on a voltage level of the battery cell 108. These various sub-modes, such as the shelf modes, may extend a lifetime of the battery system 100 by consuming less power and thereby avoiding or mitigating harmful over-discharge conditions. The first discharge threshold 206 may be selected to balance a user's interest in increasing the total runtime 208, which can be accomplished by decreasing the first discharge threshold 206, with the user's interest in maximizing the total lifetime of the battery system 100, which may be accomplished by increasing the first discharge threshold 206.

In some conditions, it may be advantageous to selectively increase the first discharge threshold 206. In various examples, the first discharge threshold 206 may be increased in certain abnormal operating conditions, such as operating conditions that substantially adversely impact a health of the battery system 100. For example, abnormal operating conditions may include light-load conditions or low-state-of-charge conditions. In various examples, therefore, the battery system 100 may modify the first discharge threshold 206 based on one or more operational parameters.

Figure 4:
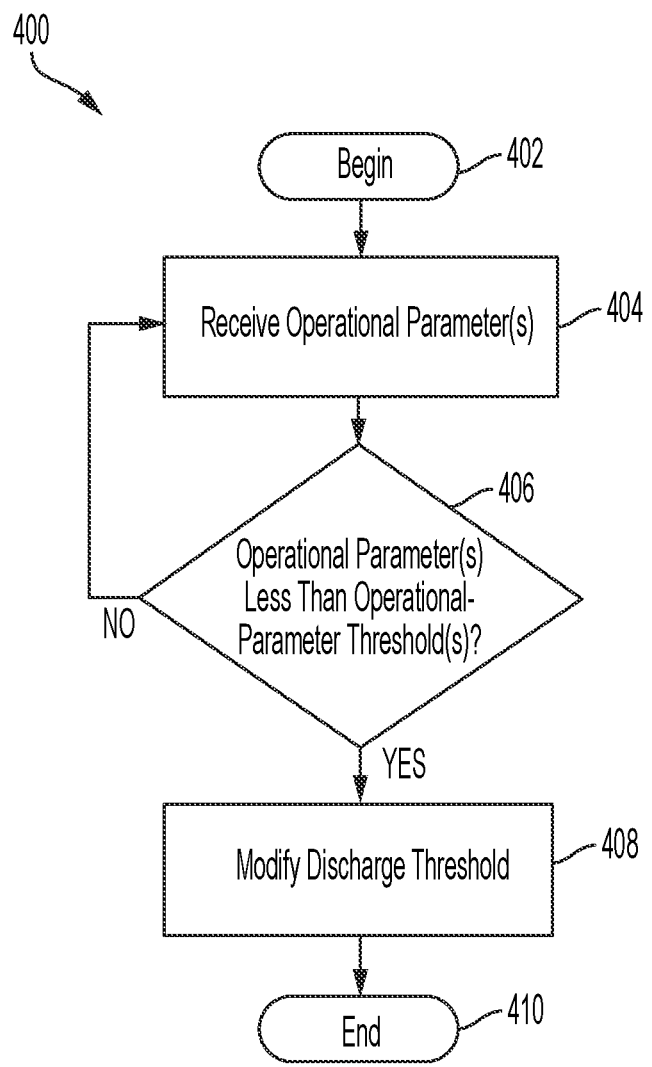
FIG. 4 illustrates a process of selecting a value of a first discharge threshold according to an example.

FIG. 4 illustrates a process 400 of selecting a value of the first discharge threshold 206 according to an example. The process 400 may be executed at least in part by the BMS 106. The process 400 is described with reference to FIG. 2.

At act 402, the process 400 begins.

At act 404, the BMS 106 receives one or more operational parameters. The one or more operational parameters may be indicative of or descriptive of one or more operating conditions of the battery system 100. For example, the one or more operational parameters may include current information, voltage information, charge information, and so forth, descriptive of the battery cell 108, a load coupled to the output 104, or other aspects of the battery system 100. In some examples, the BMS 106 may receive charge information indicative of a current SOC of the battery cell 108 from the battery cell 108, and/or from one or more sensing components in the battery system 100. In various examples, the BMS 106 may additionally or alternatively receive load information indicative of an amount of power drawn by a load coupled to the output 104. For example, the BMS 106 may receive load information from the load-detection circuit 110. In some examples, the one or more operational parameters may include additional and/or different parameters.

At act 406, the BMS 106 determines whether the one or more operational parameters are less than at least one operational-parameter threshold. For example, if the one or more operational parameters include charge information, the BMS 106 may determine whether a current SOC of the battery cell 108 is below a threshold SOC. The threshold SOC may be, for example, a certain proportion (for example, 25%, 50%, 66.7%, and so forth) of an initial SOC of the battery cell 108. The initial SOC may be an SOC of the battery cell 108 when the battery system 100 is first fully charged, or may be a rated initial SOC of the battery cell 108, for example.

In another example, if the one or more operational parameters include load information, the BMS 106 may determine whether a current amount of power drawn by a load is below a threshold load. The threshold load may be, for example, a certain proportion (for example, 10%, 25%, 33.3%, and so forth) of a rated load of the battery system 100. The rated load may be a rated amount of power that the battery system 100 is configured to provide.

In some examples, the one or more operational parameters may include both charge information and load information, and the at least one operational-parameter threshold may include several operational-parameter thresholds, including a threshold SOC and a load threshold. In still other examples, the one or more operational parameters and/or at least one operational-parameter threshold may include or be based on other parameters in addition to, or in lieu of, a charge and/or load of the battery system 100. Act 406 may include determining whether at least one of the one or more operational parameters are below the at least one operational-parameter threshold, or may include determining whether a different number (including, for example, all of the one or more operational parameters) of the one or more operational parameters are below the at least one operational-parameter threshold.

If the one or more operational parameters are not below the at least one operational-parameter threshold (406 NO), then the process 400 returns to act 404. Acts 404 and 406 may be repeated until a determination is made that at least one of the one or more operational parameters are below the at least one operational-parameter threshold (406 YES). The process 400 then continues to act 408.

At act 408, the BMS 106 modifies the first discharge threshold 206. For example, the BMS 106 may increase the first discharge threshold 206. In some examples, the BMS 106 increases the first discharge threshold 206 by a specified amount (for example, 0.1V, 0.25V, 0.45V, and so forth). In other examples, the BMS 106 increases the first discharge threshold 206 by a variable amount which varies based on the one or more operational parameters. For example, the first discharge threshold 206 may be changed by an amount that varies (for example, increases) depending on the magnitude of a difference between the one or more operational parameters and the at least one operational-parameter threshold, such that the first discharge threshold 206 is increased more as the one or more operational parameters decrease.

As illustrated in FIG. 2, a modified first discharge threshold 220 is implemented and is greater than the first discharge threshold 206. The processes 300, 400 may be executed in parallel such that the first discharge threshold 206 may be modified to the modified first discharge threshold 220 while the process 300 is being executed. Accordingly, if the first discharge threshold 206 is modified to the modified first discharge threshold 220, act 308 may instead include determining whether a cell voltage is below the modified first discharge threshold 220. By increasing the first discharge threshold 206 to the modified first discharge threshold 220, the total runtime 208 may be reduced to a modified total runtime 222, which refers to a duration of time between beginning to discharge the battery cell 108 from the fully charged voltage level 202 to reaching the modified first discharge threshold 220.

At act 410, the process 400 ends.

Accordingly, the process 400 may be executed (for example, in parallel with the process 300) to determine whether the first discharge threshold 206 should be modified to the modified first discharge threshold 220. A second voltage-level trace 221 indicates a cell voltage of the battery system 100 over time where the modified first discharge threshold 220 is implemented. The second voltage-level trace 221 is similar to (for example, has a similar slope in corresponding modes of operation as) the first voltage-level trace 204, but indicates a longer total lifetime at least in part because the modified first discharge threshold 220 is higher than the first discharge threshold 206.

As indicated by the second voltage-level trace 221, a change in cell voltage may vary based on a mode of operation of the battery system 100. In some examples, the second discharge threshold 210 may be modified to yield a modified second discharge threshold 224, and/or the third discharge threshold 214 may be modified to yield a modified third discharge threshold 226. In various examples, however, the modified second discharge threshold 224 has an identical value as the second discharge threshold 210, and/or the modified third discharge threshold 226 has an identical value as the third discharge threshold 214. Accordingly, the thresholds 224, 226 may be referred to as "modified" thresholds for purposes of explanation of the second voltage-level trace 223 in some examples.

A duration of time between the cell voltage dropping below the modified first discharge threshold 220 (which may be higher than the first discharge threshold 206) and dropping below the modified second discharge threshold 224 (which may be identical to the second discharge threshold 210) is referred to as a modified first shelf-mode duration 228. A duration of time between the cell voltage dropping below the modified second discharge threshold 224 (which may be identical to the second discharge threshold 210) and dropping below the modified third discharge threshold 226 (which may be identical to the third discharge threshold 214) is referred to as a modified second shelf-mode duration 230. A total time spent in the first shelf mode and the second shelf mode with the modified thresholds is a sum of the modified first shelf-mode duration 228 and the modified second shelf-mode duration 230, and is referred to as a modified total shelf-mode duration 232.

As indicated by the second voltage-level trace 221, a total lifetime of the battery system 100 implementing at least the modified first discharge threshold 220 may be greater than a total lifetime of the battery system 100 implementing the first discharge threshold 206, at least because the battery system 100 does not discharge power in abnormal conditions (for example, light load or low-state-of-charge conditions) for as long a duration because the threshold at which the battery system 100 enters a battery-optimization mode (for example, the first shelf mode) is increased.

Figure 5:
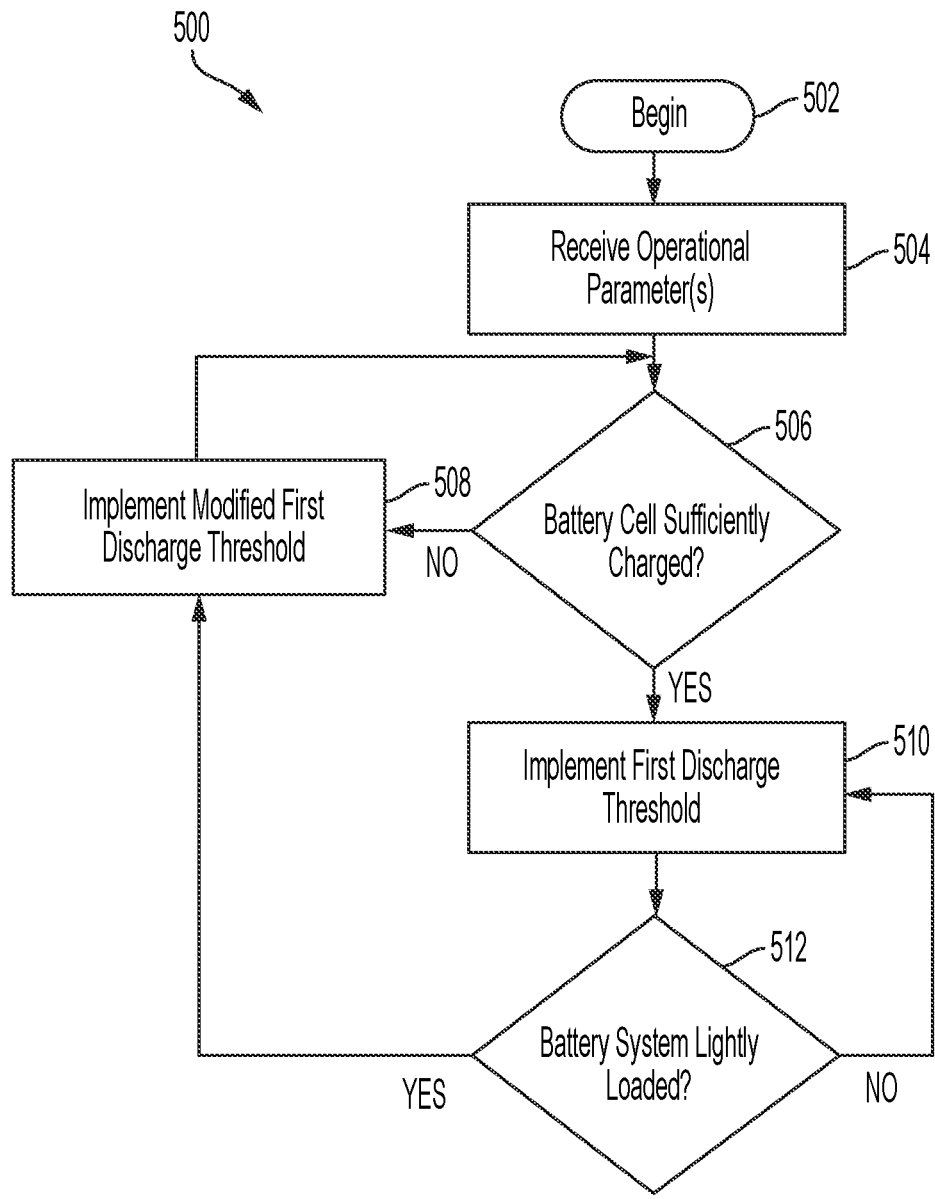
FIG. 5 illustrates a process of determining whether to modify the first discharge threshold according to one example.
Figure 6:
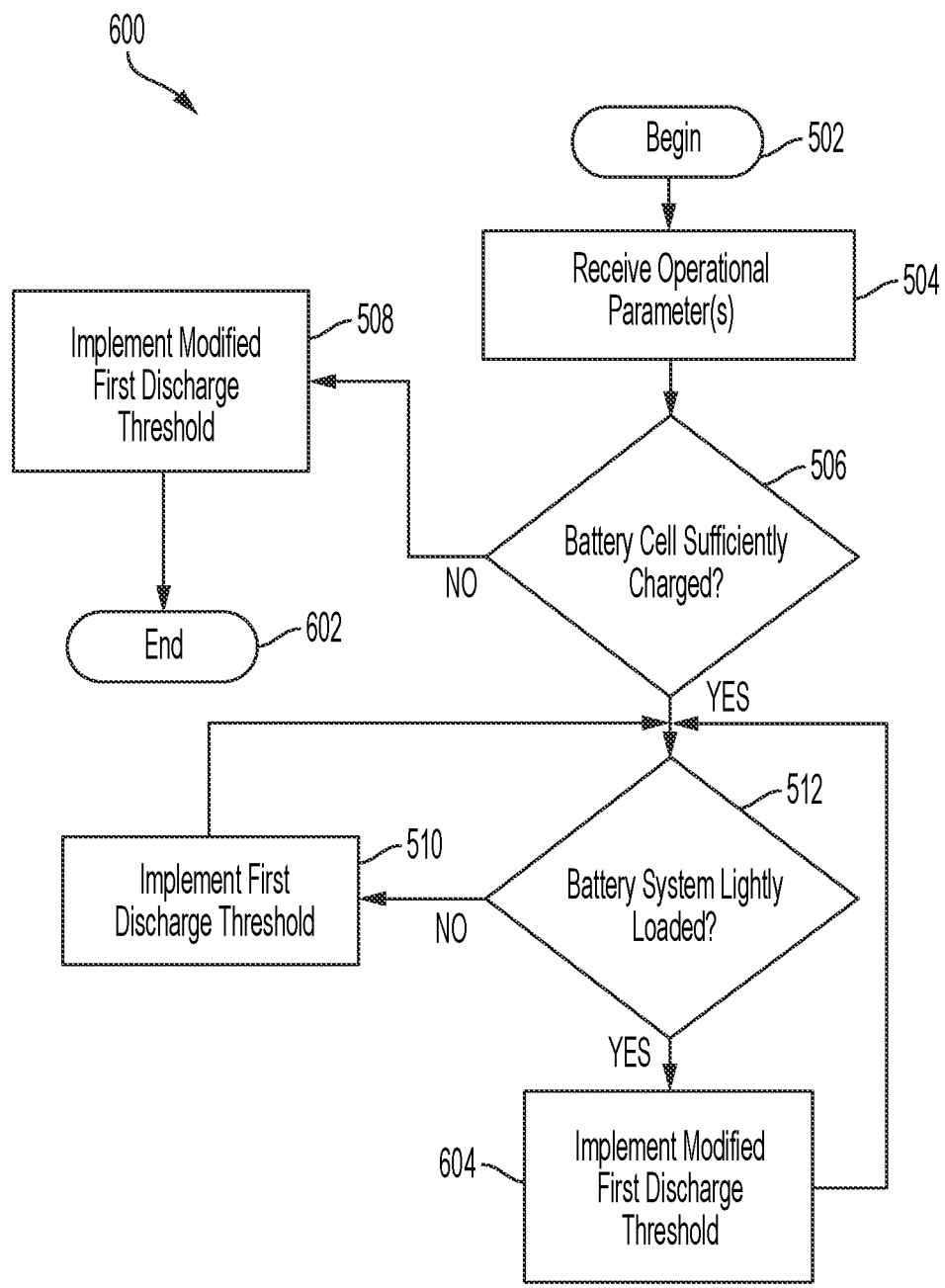
FIG. 6 illustrates a process of determining whether to modify the first discharge threshold according to another example.

Examples of modifying the first discharge threshold 206 are provided with respect to FIGS. 5 and 6. FIG. 5 illustrates a process 500 of determining whether to modify the first discharge threshold 206 according to one example. The process 500 may provide an example of the process 400. The process 500 may be executed at least in part by the BMS 106.

At act 502, the process 500 begins.

At act 504, the BMS 106 receives operational parameters. The operational parameters may include, or may include information indicative of, a current SOC of the battery cell 108 and a current load on the battery system 100.

At act 506, the BMS 106 determines whether the battery cell 108 is sufficiently charged. Act 504 may include determining whether a current SOC of the battery cell 108 is below a threshold SOC, such as approximately 50% of an initial SOC of the battery cell 108. As used herein, "approximately 50%" may include any of various examples including between 49.9% and 50.1%, between 49% and 51%, between 45% and 55%, between 40% and 60%, or other non-limiting examples. If the current SOC of the battery cell 108 is below the threshold SOC (for example, less than 50% of the initial SOC), the battery cell 108 may be considered not sufficiently charged. If the battery cell 108 is not sufficiently charged (504 NO), then the process 500 continues to act 508.

At act 508, the BMS 106 implements the modified first discharge threshold 220. Implementing the modified first discharge threshold 220 may include modifying the first discharge threshold 206 or, if the modified first discharge threshold 220 was already in effect, maintaining the modified first discharge threshold 220. The BMS 106 may implement the modified first discharge threshold 220 because the battery system 100 is not considered to be in normal use. The battery system 100 may be considered to not be in normal use because the SOC of the battery system 100 is low, and operating the battery system 100 in low SOC conditions may adversely impact a health of the battery system 100. The process 500 returns to act 508.

If the BMS 106 determines that the battery system 100 is sufficiently charged (506 YES), such as if the current SOC of the battery cell 108 is above 50% of the initial SOC of the battery cell 108, then the process 500 continues to act 510.

At act 510, the BMS 106 implements the first discharge threshold 206. Implementing the first discharge threshold 206 may include reverting the modified first discharge threshold 220 to the first discharge threshold 206 or, if the first discharge threshold 206 was already in effect, maintaining the first discharge threshold 206. The BMS 106 may implement the first discharge threshold 206 because the battery system 100 is considered to be in normal use. The battery system 100 may be considered to be in normal use because the SOC of the battery system 100 is sufficiently high to be considered normal, and operating the battery system 100 in normal SOC conditions may not substantially impact a health of the battery system 100 compared to lower SOCs. The process 500 then continues to act 512.

At act 512, the BMS 106 determines whether the battery system 100 is lightly loaded. Act 512 may include determining whether a current load on the battery system 100 is below a threshold load, such as approximately 25% of a rated load of the battery system 100. As used herein, "approximately 25%" may include any of various examples including between 24.9% and 25.1%, between 24% and 26%, between 20% and 30%, between 15% and 35%, or other non-limiting examples. If the current load on the battery system 100 is below the threshold load (for example, less than 25% of the rated load), the battery system 100 may be considered lightly loaded. If the battery system 100 is lightly loaded (512 YES), then the process 500 may proceed to act 508. In other examples, the process 500 may return to act 506. If the battery system 100 is not lightly loaded (512 NO), then the process 500 may return to act 510.

FIG. 6 illustrates a process 600 of determining whether to modify the first discharge threshold 206 according to another example. The process 600 may provide an example of the process 400. The process 600 may be executed at least in part by the BMS 106. The process 600 may be similar to the process 500, and similar acts are labeled accordingly.

Acts 502-508 are substantially similar or identical in the processes 500, 600. However, in the process 600, act 508 proceeds to act 602 rather than returning to act 506. At act 602, the process 600 ends.

Act 506 is substantially similar or identical in the processes 500, 600. However, in the process 600, if the battery system 506 is not sufficiently charged (506 NO), the process 600 continues to act 512 rather than 510.

Act 512 is substantially similar or identical in the processes 500, 600. If the battery system 100 is not lightly loaded (512 NO), the process 600 still continues to act 510. However, if the battery system 100 is lightly loaded (512 YES), the process 600 continues to act 604 rather than act 506.

At act 604, the BMS 106 implements the modified first discharge threshold 220. Act 604 may be substantially similar or identical to act 508. The process 600 then continues to act 512.

Still other modifications are within the scope of the disclosure. As discussed above with respect to the process 400, the first discharge threshold 206 may be changed based on one or more operational parameters. In some examples, as discussed above with respect to act 406, the first discharge threshold 206 may be increased responsive to determining that the one or more operational parameters are less than the at least one operational-parameter threshold.

In other examples, the first discharge threshold 206 may be changed (for example, increased or decreased) responsive to determining that the one or more operational parameters are greater than at least one operational-parameter threshold. For example, act 406 may include determining whether an operational parameter (for example, an ambient temperature) is greater than an operational-parameter threshold (for example, a threshold temperature) and, if so, the first discharge threshold 206 may be modified.

In some examples, multiple operational-parameter thresholds may be implemented, and a determination may be made as to whether a first group of operational parameters are greater than a first group of operational-parameter thresholds, and whether a second group of operational parameters are less than a second group of operational-parameter thresholds. Accordingly, examples of the disclosure are not limited to determining whether one or more operational parameters are less than at least one operational-parameter threshold.

Although certain examples of operational parameters and operational-parameter thresholds are provided, other examples are within the scope of the disclosure. The one or more operational parameters may include any number of operational parameters, and the operational-parameter thresholds may include any number of operational-parameter thresholds. The operational parameters and corresponding thresholds are not limited to charge and load information. Accordingly, various modifications are within the scope of the disclosure.

Various controllers may execute various operations discussed above. For example, the BMS 106 may include one or more controllers to execute operations discussed above. Using data stored in associated memory and/or storage, the BMS 106 also executes one or more instructions stored on one or more non-transitory computer-readable media that may result in manipulated data. In some examples, the BMS 106 may include one or more processors or other types of controllers. In one example, the BMS 106 is or includes at least one processor. In another example, the BMS 106 performs at least a portion of the operations discussed above using an application-specific integrated circuit (ASIC) tailored to perform particular operations in addition to, or in lieu of, a general-purpose processor. As illustrated by these examples, examples in accordance with the present disclosure may perform the operations described herein using many specific combinations of hardware and software and the disclosure is not limited to any particular combination of hardware and software components. Examples of the disclosure may include a computer-program product configured to execute methods, processes, and/or operations discussed above. The computer-program product may be, or include, one or more controllers and/or processors configured to execute instructions to perform methods, processes, and/or operations discussed above.

Having thus described several aspects of at least one embodiment, it is to be appreciated various alterations, modifications, and improvements will readily occur to those skilled in the art. Such alterations, modifications, and improvements are intended to be part of, and within the spirit and scope of, this disclosure. Accordingly, the foregoing description and drawings are by way of example only.

What is claimed is:

1. A battery system comprising:
   an output configured to provide output power to a load;
   one or more battery cells configured to store electrical energy to provide to the load; and
   a battery management system configured to
      receive one or more operational parameters of the battery system,
      determine whether the one or more operational parameters are less than at least one operational-parameter threshold,
      modify at least one discharge threshold of the one or more battery cells responsive to determining that the one or more operational parameters are less than the at least one operational-parameter threshold,
      control the battery system to be in a first battery-optimization mode responsive to determining that the discharge level of the one or more battery cells is below a first discharge threshold,
      control the battery system to be in a second battery-optimization mode responsive to determining that the discharge level of the one or more battery cells is below a second discharge threshold, the second discharge threshold being less than the first discharge threshold, and
      control the battery system to be in an active mode responsive to determining that the discharge level of the one or more battery cells is above the first discharge threshold, wherein the first battery-optimization mode includes disabling functionality of the battery management system to reduce power consumption relative to the active mode.

2. The battery system of claim 1, wherein the one or more operational parameters include a state of charge of the one or more battery cells, and wherein the at least one operational-parameter threshold includes a threshold state of charge.

3. The battery system of claim 2, wherein modifying the at least one discharge threshold of the one or more battery cells responsive to determining that the one or more operational parameters are less than the at least one operational-parameter threshold includes increasing the at least one discharge threshold responsive to determining that the state of charge of the one or more battery cells is below the threshold state of charge.

4. The battery system of claim 2, wherein the threshold state of charge is approximately 50% of a full initial charge.

5. The battery system of claim 1, wherein the one or more operational parameters include an amount of power drawn by the load, and wherein the at least one operational-parameter threshold includes a threshold load of the battery system.

6. The battery system of claim 5, wherein modifying the at least one discharge threshold of the one or more battery cells responsive to determining that the one or more operational parameters are less than the at least one operational-parameter threshold includes increasing the at least one discharge threshold responsive to determining that the amount of power drawn by the load is below the threshold load of the battery system.

7. The battery system of claim 5, wherein the threshold load is approximately 25% of the rated load.

8. The battery system of claim 1, wherein the at least one discharge threshold includes a value of a cell voltage of the one or more battery cells.

9. The battery system of claim 1, wherein the second battery-optimization mode includes disabling substantially all functionality of the battery management system.

10. A non-transitory computer-readable medium storing thereon sequences of computer-executable instructions for controlling a battery system having one or more battery cells configured to store electrical energy to provide to a load, the sequences of computer-executable instructions including instructions that instruct at least one processor to:
   receive one or more operational parameters of the battery system,
   determine whether the one or more operational parameters are less than at least one operational-parameter threshold,
   modify at least one discharge threshold of the one or more battery cells responsive to determining that the one or more operational parameters are less than the at least one operational-parameter threshold, and
   control the battery system to be in a first battery-optimization mode responsive to determining that the discharge level of the one or more battery cells is below a first discharge threshold,
   control the battery system to be in a second battery-optimization mode responsive to determining that the discharge level of the one or more battery cells is below a second discharge threshold, the second discharge threshold being less than the first discharge threshold, and control the battery system to be in an active mode responsive to determining that the discharge level of the one or more battery cells is above the first discharge threshold, wherein the first battery-optimization mode includes disabling functionality of the battery system to reduce power consumption relative to the active mode.

11. The non-transitory computer-readable medium of claim 10, wherein the one or more operational parameters include a state of charge of the one or more battery cells, and wherein the at least one operational-parameter threshold includes a threshold state of charge.

12. The non-transitory computer-readable medium of claim 11, wherein instructing the at least one processor to modify the at least one discharge threshold of the one or more battery cells responsive to determining that the one or more operational parameters are less than the at least one operational-parameter threshold includes increasing the at least one discharge threshold responsive to determining that the state of charge of the one or more battery cells is below the threshold state of charge.

13. The non-transitory computer-readable medium of claim 10, wherein the one or more operational parameters include an amount of power drawn by the load, and wherein the at least one operational-parameter threshold includes a threshold load of the battery system.

14. The non-transitory computer-readable medium of claim 13, wherein instructing the at least one processor to modify the at least one discharge threshold of the one or more battery cells responsive to determining that the one or more operational parameters are less than the at least one operational-parameter threshold includes increasing the at least one discharge threshold responsive to determining that the amount of power drawn by the load is below the threshold load of the battery system.

15. The non-transitory computer-readable medium of claim 10, wherein the at least one discharge threshold includes a value of a cell voltage of the one or more battery cells.

16. The non-transitory computer-readable medium of claim 10, wherein the battery system includes a battery management system, and wherein the second battery-optimization mode includes disabling substantially all functionality of the battery management system.

17. A method of controlling a battery system having one or more battery cells configured to store electrical energy to provide to a load, the method comprising:

receiving one or more operational parameters of the battery system, determining whether the one or more operational parameters are less than at least one operational-parameter threshold, modifying at least one discharge threshold of the one or more battery cells responsive to determining that the one or more operational parameters are less than the at least one operational-parameter threshold, controlling the battery system to be in a first battery-optimization mode responsive to determining that the discharge level of the one or more battery cells is below a first discharge threshold, controlling the battery system to be in a second battery-optimization mode responsive to determining that the discharge level of the one or more battery cells is below a second discharge threshold, the second discharge threshold being less than the first discharge threshold, and controlling the battery system to be in an active mode responsive to determining that the discharge level of the one or more battery cells is above the first discharge threshold, wherein the first battery-optimization mode includes disabling functionality of the battery system to reduce power consumption relative to the active mode.

18. The method of claim 17, wherein the one or more operational parameters include a state of charge of the one or more battery cells, and wherein the at least one operational-parameter threshold includes a threshold state of charge.

19. The method of claim 17, wherein modifying the at least one discharge threshold of the one or more battery cells responsive to determining that the one or more operational parameters are less than the at least one operational-parameter threshold includes increasing the at least one discharge threshold responsive to determining that the state of charge of the one or more battery cells is below the threshold state of charge.

20. The method of claim 17, wherein the one or more operational parameters include an amount of power drawn by the load, and wherein the at least one operational-parameter threshold includes a threshold load of the battery system.

21. The method of claim 20, wherein modifying the at least one discharge threshold of the one or more battery cells responsive to determining that the one or more operational parameters are less than the at least one operational-parameter threshold includes increasing the at least one discharge threshold responsive to determining that the amount of power drawn by the load is below the threshold load of the battery system.

* * * * *